S. C. McGRATH.
METHOD OF AND APPARATUS FOR RECOVERING THE BY-PRODUCTS IN THE MANUFACTURE OF FERTILIZER.
APPLICATION FILED APR. 17, 1911.
1,087,031.
Patented Feb. 10, 1914.
2 SHEETS—SHEET 1.
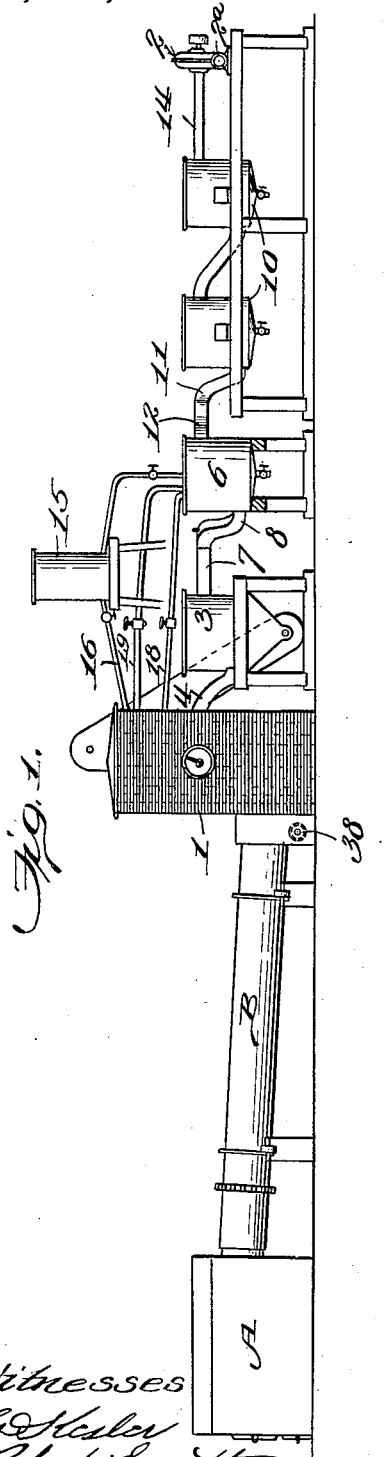
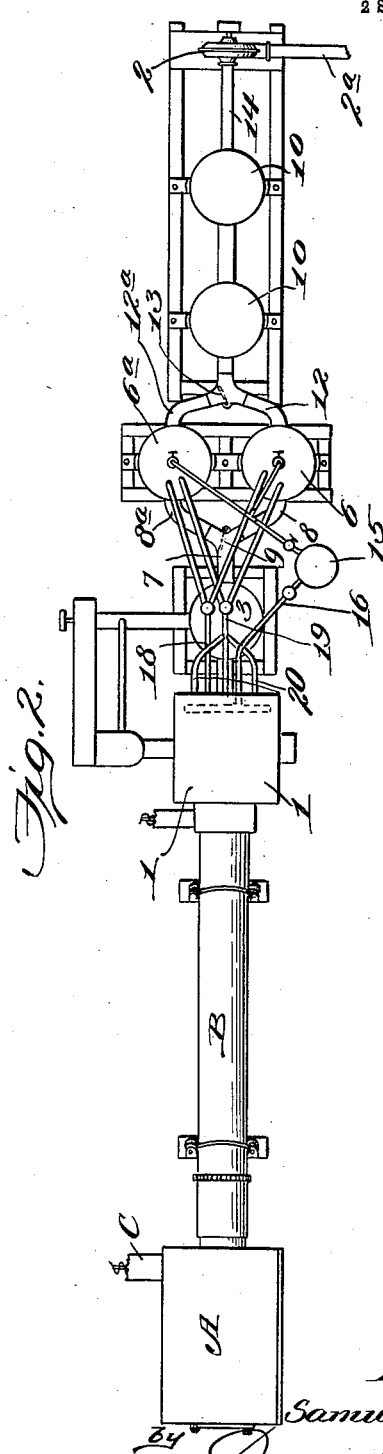
Witnesses
Inventor
Samuel C. McGrath S. C. McGRATH.
METHOD OF AND APPARATUS FOR RECOVERING THE BY-PRODUCTS IN THE MANUFACTURE OF FERTILIZER.
APPLICATION FILED APR. 17, 1911.
1,087,031.
Patented Feb. 10, 1914.
2 SHEETS—SHEET 2.
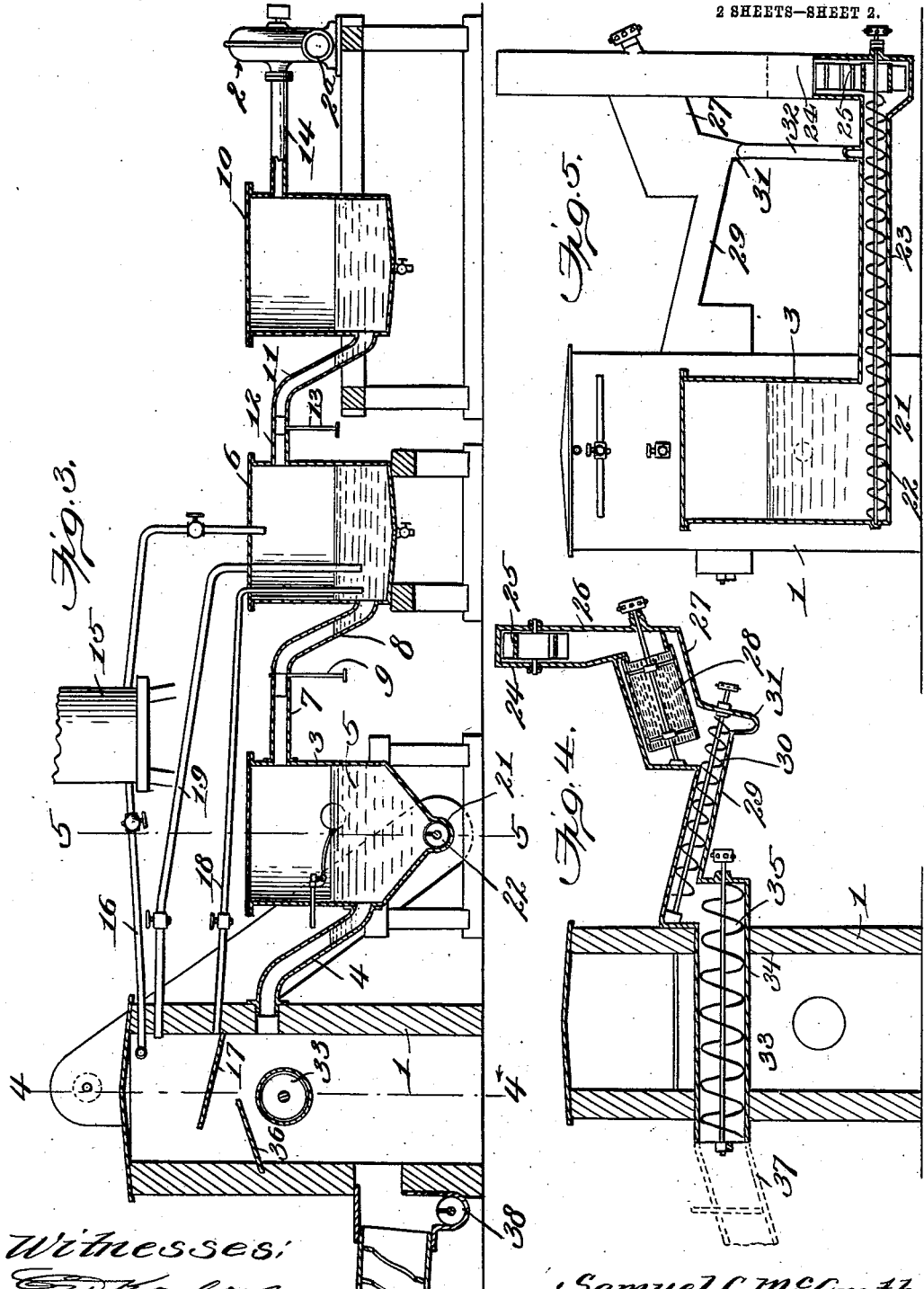

UNITED STATES PATENT OFFICE.

SAMUEL C. McGRATH, OF BALTIMORE, MARYLAND, ASSIGNOR OF NINE-TENTHS TO ALICE LILLIAN McGRATH, OF BALTIMORE, MARYLAND.

METHOD OF AND APPARATUS FOR RECOVERING THE BY-PRODUCTS IN THE MANUFACTURE OF FERTILIZER.

1,087,031. Specification of Letters Patent. Patented Feb. 10, 1914.

Application filed April 17, 1911. Serial No. 621,613.

*To all whom it may concern:*

Be it known that I, SAMUEL C. McGRATH, a citizen of the United States, residing at Baltimore city, State of Maryland, have invented new and useful Improvements in Methods of and Apparatus for Recovering the By-Products in the Manufacture of Fertilizers, of which the following is a specification.

In the manufacture of fertilizer from fish scrap and other materials well known for the purpose the gases evolved from the drying of the material are allowed to escape into the atmosphere through an open chimney which promotes a natural draft. This arrangement results in a number of highly disadvantageous conditions. In the first place, these gases laden with ammonia are highly obnoxious and pollute the atmosphere for a distance of some miles. On this account it is not practical to pursue the industry in a populous or even moderately populated community. In the second place, the valuable products which are bound up in the gases and which are, essentially, ammonia, the active constituent of fertilizers and solid matter rich in ammonia, are allowed to escape and consequently there is a total loss of valuable by-products. In the third place it happens that there is a comparatively thick deposit of material on the lining of the chimney which has to be removed from time to time and such removal is costly, not only intrinsically but because it necessitates the discontinuance of the operation of the furnace or the battery of furnaces which are connected to the chimney. Finally the arrangement is disadvantageous because the natural draft frequently promotes the burning of the deposit of the material in the chimney and occasionally, even of the fish scrap or other material in the drier, and it is sometimes necesary to use a fire extinguishing apparatus to prevent the destruction of the material in the drier and to avoid endangering the plant.

The objects of the present invention are to eliminate the disadvantages noted and the invention accordingly proposes a method of and apparatus for treating the gases evolved from the drying of fish scrap and other material which is to be understood as included, for the purposes of this specification, under the designation of fish scrap, whereby these gases are finally rendered innocuous or substantially so; the valuable solid and gaseous by-products are separated and separately recovered in a condition enabling their commercial use without further treatment; and other incidental disadvantages referred to in the foregoing paragraph are eliminated.

The method and apparatus constituting the present invention will be readily understood by reference to the accompanying drawings, wherein—

Figure 1 is a side elevation showing the furnace, the drier and the apparatus of the present invention in connection therewith; Fig. 2 is a top plan view of the same; Fig. 3 is a detail longitudinal sectional view, the furnace being omitted; Fig. 4 is a cross section on the line 4—4 of Fig. 3; and Fig. 5 is a cross section on the line 5—5 of Fig. 3.

Similar characters of reference designate corresponding parts throughout the several views.

The furnace is shown at A (Figs. 1 and 2) and the rotary drier at B, these elements being of the ordinary construction. The fish scrap is delivered to the drier by a suitable conveyer, shown diagrammatically at C. In the usual practice of the art the drier communicates with an open chimney or stack. According to the present invention, however, the drier communicates with a closed chamber 1 which is of suitable air tight construction. The gases which enter the chamber 1 pass in succession through a separating tank, an acid tank, and a sealing chamber. To secure this action a suction pump 2, having a gas outlet 2ª is employed. The pump 2 creates a forced uniform draft which promotes combustion in the furnace and which draws the gases through the various chambers and tanks referred to.

The separating tank is indicated by the numeral 3 and is of suitable air tight construction. The tank 3 is connected to the chamber 1 by a pipe 4 which leads downwardly from said chamber. The gases enter the tank 3 through the pipe 4 and during their travel pass through a body of water 5 which partially fills said tank and said pipe. The water 5 may be obtained from any suitable source, although, in the interest of economy, the water which is extracted during the treatment of the fish in the oil press may be employed, since such water is rich in ammonia and solid ammonia-bearing particles.

It is preferred to provide two or more acid tanks. Two acid tanks are shown in the drawings and are indicated by the numerals 6 and 6ª respectively. These tanks are so arranged that one may be put in service when the acid in the other is being renewed and consequently the renewal of the acid does not entail an interruption of the treatment of the gases. The gases leave the tank 3 by a pipe 7 having two branches 8 and 8ª which lead to the tanks 6 and 6ª respectively. A valve or damper 9 is provided at the junction of the branches 8 and 8ª and said valve or damper, in accordance with its position, causes the gases to flow into either of the tanks 6 or 6ª. After leaving the acid tank the gases pass into a sealing chamber 10. If desired, two of these chambers may be employed, as shown in Figs. 1 and 2, in which case the gases will pass through them in succession. For convenience, only one chamber 10 is shown in Fig. 3, this being sufficient to illustrate the principle involved. The connections between the tanks 6 and 6ª and the adjacent chamber 10 comprises a pipe 11 which leads downwardly to said chamber 10, and branches 12 and 12ª which join with the pipe 11 and lead from the tanks 6 and 6ª respectively. A valve or damper 13 is arranged at the junction of the branches 12 and 12ª to interrupt the communication of either of the tanks 6 or 6ª with the pipe 11 when the acid of such tank is being renewed. From the sealing chamber or the last sealing chamber if there be more than one, the gases pass by way of a pipe 14 to the pump 2 and from the latter through the outlet 2ª to any place or means of final disposition or treatment.

The tanks 6 and 6ª are supplied with acid from a reservoir 15 which is supported at a suitable elevation. The pipes which lead from said reservoir to the acid tanks terminate near the tops of the latter and deliver the acid as a falling spray through which the gases rise. A pipe 16 leads from the reservoir 15 to the chamber 1 near the top of the latter and within said chamber is provided with a suitable rose or perforated head to discharge the acid in the form of a spray. The acid thus discharged collects in a trough which is afforded by an inclined shelf 17 and is conducted to the tank 6 or 6ª by a pipe 18 having branches which lead to said tanks. Between the pipes 16 and 18 and at a suitable elevation a pipe 19 is arranged. This pipe 19 is preferably provided with a plurality of branches 20 which extend into the chamber 1 and at its opposite ends it is provided with branches which lead to the tanks 6 and 6ª. The branches of the pipes 18 and 19 within the tanks 6 and 6ª have such extent as to be submerged in the acid in said tanks. By virtue of the provision of the pipe 19 a slight draft is created in the upper portion of the chamber 1 which causes the lighter portion of the ammoniacal constituents of the gases to rise to the upper portion of the chamber and to pass through the branches 20 and the pipe 19. As the diverted portion of the gases pass through the spray delivered by the pipe 16 the ammonia is absorbed by the falling acid which collects on the shelf 17 and is returned to the tank 6 or 6ª as the case may be. By thus separating a portion of the ammonia in advance of the passage of the gas through the separating tank, the percentage of moisture taken up by the gases in their passage through the separating tank and carried over to the acid tank is considerably reduced and it follows that a too great dilution of the acid is prevented.

As the gases pass through the separating tank 3 an efficient scrubbing action is obtained and the suspended solid matters are precipitated and fall to the bottom of said tank. The recovery and treatment of the solid matters thus deposited are important features of the invention and a means for this purpose is herein shown by way of example. The lower portion of the tank 3 has a trough shaped cross section and at its lowest point is formed with a channel 21 which partially incloses a transverse spiral conveyer 22. The latter extends for a considerable distance beyond the tank 3 and its extended portion works in a tubular casing 23 which forms, in effect, an axial continuation of the channel 21. The casing 23 communicates with a casing 24 which is disposed in a vertical plane and incloses an endless belt conveyer 25. The solid matter carried by the conveyer 22 is delivered to the buckets of the conveyer 25 which discharges such solid matter into a hopper 26. The latter communicates with a casing 27 which incloses a rotary screen 28, arranged to incline downwardly toward the chamber 1. The casing 27 is joined to a second casing 29 which preferably has an upward inclination and incloses a spiral conveyer 30 into which the solid matter not passed by the screen 28 is delivered. The liquid which is discharged through the screen 28 and which carries with it a small percentage of fine sediment flows to a trap 31 arranged at the lowest point of the casing 27 and from said trap is returned by a pipe 32 to the casing 23. A suitable drier 33 is arranged within the chamber 1. This drier may advantageously comprise a tubular casing 34 and a spiral conveyer 35 working within said casing 34. The casing 29 is joined to the inlet end of the casing 34 at the upper side of the latter so that the solid matter precipitated in the tank 3 is ultimately carried through the casing 34 in which the drying of the recovered product is effected. The casing 34 is of course heated by the gases which rise through the chamber 1 and to insure the efficiency of this action a baffle plate 36 is provided which deflects the hot gases against the casing 34 and also prevents said gases from having any substantial effect on the sulfate collected on the ledge 17. The casing 34 discharges by way of an extension 37, shown in dotted lines, which conducts the dried recovered solid matter to any suitable receiver.

In practice the bulk of the dried fish scrap is removed from the drier B by a conveyer 38 which is arranged adjacent the chamber 1. The gases passing from the drier enter the chamber 1 wherein they are utilized to dry the solid matter in the drier 33 and wherein a portion of their lighter ammoniacal constituents are diverted and subjected to a preliminary acid treatment by the spray which discharges from the pipe 16. The major portion of the gases leaves the chamber 1 through the pipe 4 and rises through the water in the latter. The gases as they pass through the tank 3 are efficiently scrubbed and solid particles carried along thereby are precipitated and carried to the drier 33 by the system of conveyers described. The gases after rising through the water in the tank 3, pass to the tank 6 or 6ª, as the case may be, wherein they rise through the body of acid in said tank and through the falling spray of acid. In the manufacture of fertilizer a dilute solution of sulfuric acid is employed to absorb the ammonia and to produce ammonium sulfate and the acid may, when necessary, be drawn off from time to time into suitable vessels or carboys. The percentage of moisture which is carried over from the tank 3 to the acid tank is materially reduced by virtue of the provision of the means for obtaining a preliminary acid treatment in the chamber 1. Leaving the acid tank the gases pass through the sealing tank or tanks 10 wherein any acid carried over and any excess of ammonia is absorbed. The tank 10 serves not only as a final scrubbing medium but also as a means to prevent the passage of acid to the pump 2 and thus protects the latter. The gases, leaving the tank or tanks 10, are discharged by the pump 2 in an innocuous condition.

Having explained the method which constitutes the present invention and a suitable apparatus for carrying said method into effect, it may be noted that the chief advantages are the recovery of the valuable by-products and the discharge of the gas in an innocuous condition. It is well known that the solid matters carried along by the gases are much finer and richer in ammonia and consequently of considerably greater commercial value than the fish scrap which is removed from the drier. Heretofore, however, only such a percentage of the suspended solid matter has been recovered as may have been deposited on the lining of the chimney; the rest of the suspended solid matter was allowed to go to waste; and the recovery of that deposit has been attended with considerable expense. The present method provides for the recovery of practically all the suspended solid matter in a merchantable state and in an efficient and inexpensive manner and it provides also for the separate recovery of the other valuable by-product, ammonia, in a merchantable state and in an equally efficient and inexpensive manner.

It will of course be understood that any suitable means may be employed to keep the water in the tank 3 at the proper temperature. Such arrangements are well known and form no part of the present invention; an illustration and description thereof is deemed unnecessary. To compensate for loss of water in the tank 3 any desired constant level device, such as the well known float valve, may be employed.

It will be understood that no specific description herein contained is intended to put any limitation upon the scope of the appended claims which does not inhere in the language thereof.

Having fully described my invention, I claim:

1. A method of recovering by-products from the gases of fish drying furnaces which comprise the steps of scrubbing the gases to remove suspended solid matters therefrom, collecting the solid matters precipitated during the scrubbing step, and utilizing the heat of the gases previous to their scrubbing treatment to dry the solid matters recovered.

2. A method of recovering by-products from the gases of fish drying furnaces which comprises the steps of scrubbing the gases to remove suspended solid matters therefrom, collecting the solid matters precipitated during the scrubbing step, subjecting the gases to acid treatment for the recovery of ammonia after the scrubbing step, and utilizing the heat of the gases previous to their scrubbing treatment to dry the solid matters recovered.

3. A method of recovering by-products from the gases of fish drying furnaces which comprises the steps of scrubbing the gases to remove suspended solid matters therefrom, collecting the solid matters precipitated during the scrubbing step, and utilizng the heat of the gases to dry the solid matters recovered.

4. A method of recovering by-products from the gases of fish drying furnaces which comprises the steps of diverting the lighter constituents of the gases and subjecting them to an acid treatment, scrubbing the remainder of the gases, and subjecting the scrubbed gases to an acid treatment.

5. A method of recovering by-products from the gases of fish drying furnaces which comprises the steps of diverting the lighter constituents of the gases and subjecting them to a preliminary acid treatment, scrubbing the remainder of the gases, subjecting the scrubbed gases to an acid treatment, and subjecting the diverted gases to a second acid treatment in connection with the acid treatment of the scrubbed gases.

6. A method of recovering by-products from the gases of fish drying furnaces which comprises the steps of diverting the lighter constituents of the gases and subjecting them to a preliminary acid treatment, scrubbing the remainder of the gases, subjecting the scrubbed gases to an acid treatment, subjecting the diverted gases to a second acid treatment in connection with the acid treatment of the scrubbed gases, collecting the solid matters precipitated during the scrubbing step, and utilizing the heat of the gases previous to the scrubbing step to dry the solid matter recovered.

7. An apparatus for recovering by-products from the gases of fish drying furnaces which comprises a closed air tight chamber into which the gases pass, a scrubber to which the gases pass from the chamber, a drier arranged in the chamber, means for transferring the solid matter precipitated in the scrubber to the drier, and a pump for causing a forced draft and for drawing the gases through said chamber and scrubber.

8. An apparatus for recovering by-products from the gases of fish drying furnaces which comprises a closed air tight chamber into which the gases pass, a scrubber to which the gases pass from the chamber, a drier arranged in the chamber, means for transferring the solid matter precipitated in the scrubber to the drier, an acid tank to which the gases pass from the scrubber, and a pump for causing a forced draft and for drawing the gases through said chamber, scrubber and acid tank.

9. An apparatus for recovering by-products from the gases of fish drying furnaces which comprises a scrubber connected to the furnace and into which the gases pass, a drier arranged to be heated by the flowing gases, and means for collecting the solid matter precipitated in the scrubber and for transferring said solid matter to said drier.

10. An apparatus for recovering by-products from the gases of fish drying furnaces which comprises an air tight chamber into which the gases pass, a scrubber into which the gases pass from the chamber, a drier arranged within the chamber, means for transferring the solid matter precipitated in the scrubber to the drier, an acid tank to which the gases pass from the scrubber, a sealing chamber to which the gases pass from the acid tank and a pump for drawing the gases through said air tight chamber, scrubber, acid tank and sealing chamber.

11. An apparatus for recovering by-products from the gases of fish drying furnaces which comprises an air tight chamber into which the gases pass, a scrubber into which the gases pass from the chamber, a drier arranged within the chamber, means for transferring the solid matter precipitated in the scrubber to the drier, an acid tank to which the gases pass from the scrubber, a sealing chamber to which the gases pass from the acid tank, an acid reservoir for supplying the tank, a pipe extending between the reservoir and the air tight chamber and provided with a rose in the latter, a shelf upon which the acid sprayed from the rose collects, a pipe for conveying the acid which collects in the shelf to said acid tank, and a pump for drawing the gases through said air tight chamber, scrubber, acid tank and sealing chamber.

In testimony whereof I have hereunto set my hand in presence of two subscribing witnesses.

SAMUEL C. McGRATH.

Witnesses:
  JOHN L. POWERS,
  H. L. MacCARTENY.

---

Copies of this patent may be obtained for five cents each, by addressing the "Commissioner of Patents, Washington, D. C."